Dec. 5, 1939.  P. A. RICHARD  2,182,054
AIR COOLED ENGINE ON AIRCRAFT
Filed March 19, 1937  2 Sheets-Sheet 1

Inventor:
Paul Aimé Richard,

Bailey & Carson
Attorneys

Patented Dec. 5, 1939

2,182,054

UNITED STATES PATENT OFFICE 2,182,054

AIR COOLED ENGINE ON AIRCRAFT

Paul Aimé Richard, Clichy, France

Application March 19, 1937, Serial No. 131,947
In France March 24, 1936

4 Claims. (Cl. 244—53)

My present invention relates to aircraft, for example aeroplanes, of the kind in which the engine or each engine is mounted within a wing and is adapted to be cooled by means of air admitted at one part of the wing, such cooling air being arranged to flow over the engine and to leave the wing at another point or points.

It is an object of the invention to improve the working conditions of aircraft of this kind.

According to my present invention I provide in an aircraft of the kind specified blower or fan means arranged in or in communication with the housing of an engine or group of engines and communicating with an outlet from the wing, said blower or fan means being so located in relation to the engine or engine group, e. g. to the rear of the latter in the direction of the air stream, as to increase the pressure of the cooling air or a mixture of the cooling air and exhaust gases after this cooling air has performed its cooling function.

In the practice of my invention, use may be made of the air discharged and reheated by the cooling of the engines, and, in certain circumstances by the exhaust gases, to produce an auxiliary propulsive effect of the "reaction" type or in other ways to improve the flying qualities of an aircraft as will be hereinafter disclosed.

Other features of the present invention will result from the following detailed description of some specific embodiments thereof.

Figure 1:
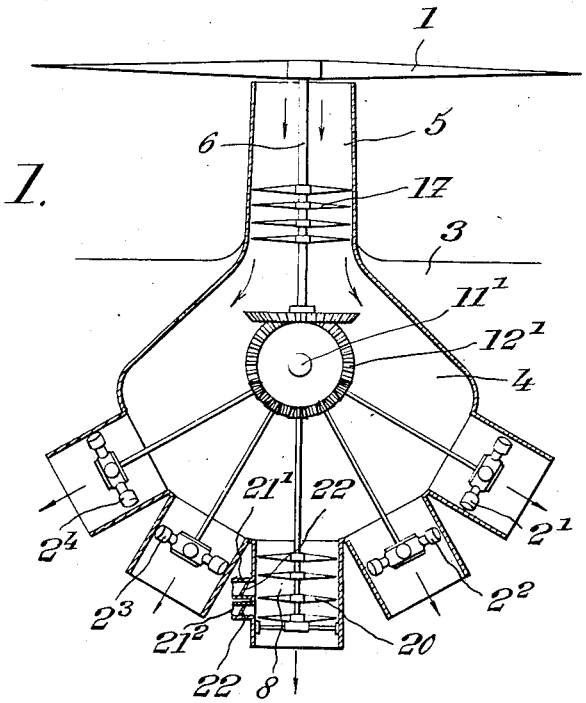
Figure 3:
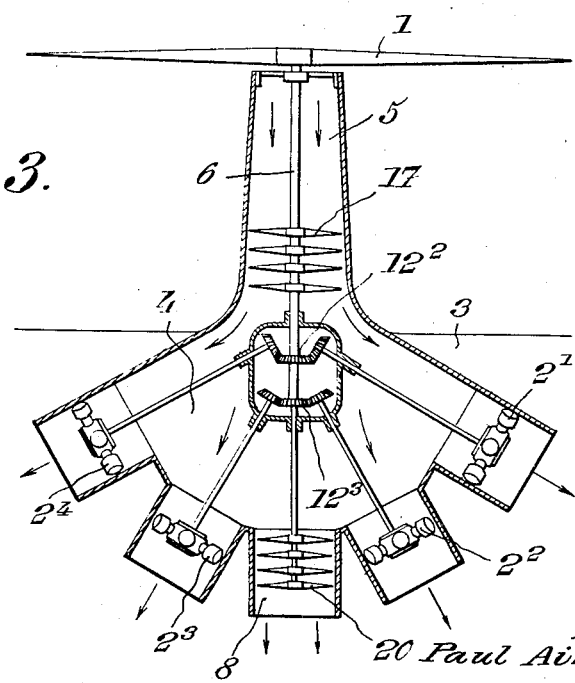
Figure 2:
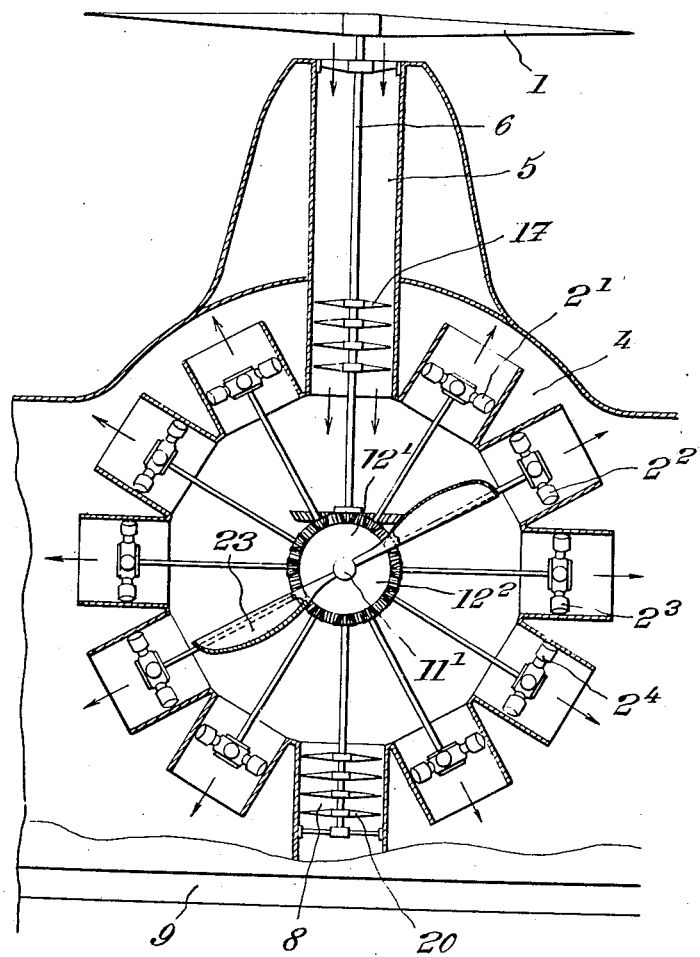

Preferred embodiments of the present invention will be hereinafter described, with reference to the accompanying drawings, given merely by way of example, and in which:

Figs. 1, 2 and 3 are diagrammatic horizontal sectional views corresponding respectively to three different embodiments.

The present invention relates, in a general manner, to the mounting of engines on an aircraft, and more especially, as it will be supposed in the following description, on an airplane having thick wings.

After having determined the number of propelling means, for instance screw propellers, necessary for the propulsion of the airplane, and also the number of engines necessary for driving said propelling means, I determine the point or points of the span where the propelling means and the engines which are to drive them are to be established. Of course, the intervals between the propelling means may be either uniform or not. It should be noted that the number of propellers may be reduced to one or may be chosen as great as it is desired, account being taken of the available span and the place occupied by the individual engines or the groups of engines. For instance, in the example of Figs. 1 and 3, it has been assumed that each of the propellers is driven by four engines, whereas, in the example of Fig. 2 more engines are provided.

At the place where I wish to provide a propeller 1 with its engines, such as $2^1$, $2^2$, $2^3$, and $2^4$, I leave, in the thickness of wing 3 and close to the leading edge thereof, a housing 4 intended to receive the engine or engines. This housing communicates with a conduit 5 open at its free end opposite the relative wind. The section of flow through said conduit may be either constant or adjustable through a shutter or the like controlled from a distance. Axially with respect to this conduit 5, there is provided the shaft 6 that carries and drives propelling element 1, for instance a simple or double screw propeller (fixed or variable pitch screw propeller, propellers turning in opposite directions, and so on).

Housing 3 is prolonged to the rear by one or several conduits among which there is a conduit 8 the end of which forms a slot 9 (see Fig. 2), of adjustable or fixed width, provided at a suitable part of the upper face or the trailing edge of the wing, and extending over the whole or a part of the span thereof.

The shaft 6 of the propeller is driven through a suitable transmission, for instance an intermediate shaft and bevel gears, this intermediate shaft being itself driven by the various engines which belong to the corresponding group.

In the example according to Fig. 1, the engines are arranged in fan-like fashion along a circular arc the center of which coincides with the axis $11^1$ of a central gear $12^1$, driving the shaft 6 of screw 1.

In the example of Fig. 2, the engines are distributed along a circumference and act upon a central gear $12^1$, as in the case of Fig. 1.

In the example of Fig. 3, the engines form two groups disposed respectively along different circular arcs. The engines $2^1$ and $2^4$ of one of the groups drive shaft 6 through a central gear $12^2$ and the engines $2^2$ and $2^3$ of the other group act upon this shaft through another gear $12^3$.

Of course, the arrangements above described and illustrated in the drawings have no limitative character and merely indicate some examples of the arrangement of the engine or engines in a suitable housing provided in the wing proper, said engines driving, either individually or by group, propelling means through a suitable transmission, which is common to all the elements of a group.

According to another feature of the invention, I drive, through the shaft 6 of propeller 1, compressing means such as multiple fan 17 which is mounted in the air intake conduit 5.

I may also provide in conduit 8, which extends on the rear of housing 4, compressing means such as fans 20 with stepped blades which increase the pressure of the air or of a portion of the air that has been used for cooling. They may be adapted to give a variable output by bringing into play, as shown by Fig. 1, for each compression stage, a tube such as $21^1$ or $21^2$, which opens into conduit 8 and which includes an adjustment valve 22 adapted to permit of by-passing a portion of the air discharged by the fan.

Finally, as shown by Fig. 2, I may fit on shaft $11^1$ of the central gear $12^1$, the blades of a fan 23 which drive the air admitted into housing 4 toward the engines distributed along a circular line around said gear.

When making use of the arrangement illustrated, I obtain, in flight, that air under pressure penetrates, through intake conduit 5, into housing 4 and is evenly distributed therein in such manner as to cool the engines in the most advantageous conditions. Air escapes through the conduit or conduits 8 opening to the upper surface of the wing and in which, accordingly, there is a suction.

It should be further noted that the hot air discharged by conduit or conduits 8 improves the aerodynamic qualities of the wing section and acts, by expansion when flowing out from slot 9, so as to exert a useful propelling effect by reaction.

In the embodiments shown, the degree of cooling of the engines can be intensified by making use of fans 20 disposed on the rear of the housings 4.

The exhaust gases of the engines can be sent directly into housings 4 in such manner as to heat the air admitted into these housings. The mixture of hot air and gas subsequently escapes through conduit 8 in such manner that the kinetic or dynamic properties of the hot mixture are improved by the addition of the calories supplied by the exhaust gases of the engines.

A portion of said air can then be fed through conduits or through tubes $21^1$ or $21^2$ (Fig. 1) for use for any desired purpose.

It should be noted that, when the airplane is running on the ground, the valves 22 of tubes such as $21^1$ and $21^2$ (Fig. 1) are closed in such manner that the air discharged by fans 20 can be used wholly for improving the lift, and for performing a useful propulsion effect. As the height of flight increases, a portion of said air can flow through tube $21^1$ or $21^2$, the valve of which is opened.

The systems of mounting engines on aircrafts according to the present invention as above set forth permits of obtaining a scientific cooling of the engines under all the conditions that may occur in practice, that is to say when running on the ground, when taking off, when flying at low speed, when flying at cruising speed and at high altitudes. As the engines are housed in the wings proper, their head resistance is practically zero and the walls of their housing can be arranged in such manner that the air circulation around the pieces to be cooled is very good. Furthermore, this hot air (eventually further heated by the exhaust gases) contributes to improve the aerodynamic properties and the propulsion of aircrafts equipped with engines mounted in the manner above set forth. It should be noted that, in the case in which the engines are mounted as indicated on a multi-engined aircraft, it is possible to stop in flight one or several groups of engines without influencing the aerodynamic properties of the wing in which said engines are housed.

In a general manner, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the appended claims.

What I claim is:

1. In an aircraft, a wing structure provided with at least one housing therein, propelling means for said aircraft, at least one air cooled engine for driving said propelling means mounted in said housing, a conduit in said wing connecting the front part of said housing with the atmosphere opening at the front part of said wing structure, compressing means in said conduit for forcing air into said housing, passages at the rear of said housing for the escape of air fed through said conduit to said housing, whereby an air circulation is established through said housing for cooling said engine, and air driving means in said outlet passages for facilitating the outflow of air from said housing through said passages.

2. In a device as claimed in claim 1, means to regulate the action of said air driving means comprising outlets connected to said outlet passages and controllable valves in said outlets.

3. A combination according to claim 1 further including means for mixing exhaust gases from said engine with the air escaping through said passages.

4. In a device as claimed in claim 1, in which a plurality of motors are arranged in said housing about a common axis, means rotating about said axis to distribute air to said motors.

PAUL AIMÉ RICHARD.